United States Patent Office 3,053,880
Patented Sept. 11, 1962

3,053,880
SEPARATION OF ACYCLIC ALPHA OR BETA
DIOL ISOMERS
Johannes Dale, Brussels, Belgium, assignor to Union
Carbide Corporation, a corporation of New York
No Drawing. Filed Mar. 15, 1960, Ser. No. 15,038
11 Claims. (Cl. 260—462)

This invention relates to a method for the separation of polyol isomers. More particularly, this invention relates to the separation of acyclic α- or β-diol isomers or mixtures thereof.

The need for an effective method of separating α- or β-diol isomers has become especially necessary in those reduction processes where diols are obtained. It is known that the isomers of 2,4-pentanediol may be separated by contacting the isomers with sodium borate, thereby complexing both isomers to form a pair of diol-borate complexes, and thereafter separating the complexes formed by means of an ion-exchange column. However, this method is only practical for the separation of relatively small quantities of isomers. Moreover, since the eluted solutions are very dilute and the diols very soluble in water, recovery of the desired isomers is difficult.

It is an object of this invention to provide a method for the quantitative separation of certain diol isomers, and more particularly of certain α- or β-diol isomers.

Other objects will become apparent from the appended specification and claims.

According to this invention, a method for the separation of α- or β-diol isomers having terminal groups larger than methyl groups, comprises contacting the isomers with an alkali metal borate, whereby the selective formation of a stable diol-borate complex is effected with one isomer, and thereafter separating the stable complex formed from the uncomplexed isomer. By the process of this invention, an almost quantitative separation is effected.

This invention directly results from the discovery that the formation of stable-diol-borate complexes depends on the steric configuration of the diols. The following discussion will illustrate this phenomena:

It is known that the reaction of an alkali-metal borate with an α-diol will lead to the formation of a five-membered, essentially planar ring as shown below:

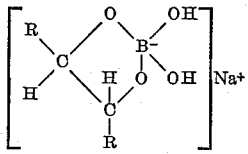

However, it has now been found that where the two R substituents of the above configuration represent groups larger than —$CH_3$, a stable complex will form with the racemic isomer (actually drawn) but not with the meso-isomer.

In the meso form, the two R substituents would have to be on the same side of the ring and therefore in very close approach to each other. As a consequence, severe steric hindrance has been found to occur as soon as the substituted R group is larger than —$CH_3$. Hence a stable borate complex will not form with the meso isomer. In the racemic form, on the other hand, the two R substituents are on opposite sides of the ring. In this form, there is no steric hindrance and a stable borate complex is formed.

It is also known that the reaction of an alkali-metal borate with a β-diol will form a complex. However, in this case, a six-membered ring is formed which is not planar in configuration. In the meso-1,3-diol-borate complex, both R substituents are on the same side and can occupy the unhindered equatorial position thereby leading to the stable ring system shown below:

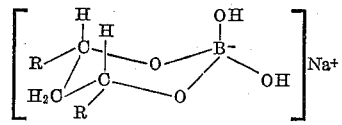

In the racemic 1,3-diol-borate complex, on the other hand, only one R substituent can be equatorially located. The other R substituent is axially located and relatively close to a hydrogen atom and the hydroxyl group on the boron atom. Hence, where R is a group larger than methyl, the formation of a stable racemic β-diol-borate complex is prevented. This configuration is shown below:

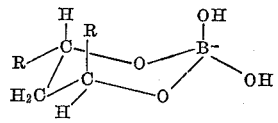

It should be noted that with the α-diols, the racemic isomer forms a stable borate complex, whereas the meso does not. With the β-diols, the situation is reversed. However, in both cases, the selective formation of one isomer rather than the complexing of both is effected.

The importance of the steric effect of the R substituents on the formation of stable diol-borate complexes can be demonstrated. For example, when R is a phenyl group, the quantitative separation of the isomers can successfully be effected. On the other hand, when R is a methyl group, the separation effectiveness is reduced. This is because in the latter instance, both the meso and racemic isomers are capable of forming a borate complex, although of different stability.

Where both isomers form a complex, separation can only be achieved by acting upon the stability differences between the complexes, i.e. by using an insufficient amount of alkali metal borate or by employing an ion-exchange column. The degree of separation achieved using such a column is impractical for large quantities of isomers.

Therefore, for the practice of this invention, separable diols include open-chain diols having the following formulae:

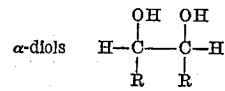

and

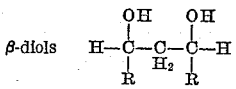

wherein R is an aliphatic group (in general larger than $CH_3$), or an aromatic group. For the purposes of this invention, the expression R may conveniently be represented as an organic group sterically larger than $CH_3$. It is to be understood that the two R groups do not have to be identical. In such unsymmetrical diols the isomers are both racemic and are called the erythro and threo forms. The erythro behaves as the meso, while the threo behaves as the racemic. Therefore, for α-diols, the threo forms the complex while for β-diols, erythro forms the complex.

It is also to be understood that tri-substituted diols can also be separated by the process of this invention. However, in this case, it is essential that one of the substituents on the tertiary carbon atom be no larger than a $CH_3$ group.

Before the separation procedure, the diols to be separated, if they are solids, are usually dissolved in water or in alcohols. Examples of such alcohol solvents are methanol and ethanol.

Typical diols separable by the process of this invention include:

1,2-diphenyl ethylene glycol (hydrobenzoin)
1,2-ditertiary butyl ethylene glycol,
1,3-diphenyl propanediol 1,3, and
1,3-ditertiary butyl propanediol 1,3.

The complexing agents that may be used in the practice of this invention are alkali-metal borates. Those borates particularly preferred are those of sodium and potassium. In this regard, the use of concentrated aqueous solutions of the complexing agents with an excess of alkali is also preferred. However, it is also advisable to employ an excess of borate with respect to the diols to be separated except when R is a methyl group, as well as an excess of alkali with respect to the quantity of borate used.

The quantitative separation of the diol-borate complex from the non-complexed isomer and from the excess complexing agent, can usually only be effected after elimination of water from the reaction mixture since the diol-borate complex is usually partially hydrolyzed in aqueous solutions. This hydrolysis equilibrium can thus be shifted towards the complex by the complete removal of water. In other words, the separation is effected by changing the medium condition so that the hydrolysis of the diol-borate complex is prevented.

This change in the medium condition may be achieved initially by evaporating the complex-isomer mixture to dryness and extracting the residue obtained with a solvent which will not dissolve the diol-borate complex but will dissolve the non-complexed isomer. Examples of such solvents are ether, chloroform, and benzene. The non-complexed isomer may then be isolated from the extract by crystallization or other suitable means.

The liberation of the remaining diol isomer from the insoluble residue containing the diol-borate complex and the excess of complexing agent requires a procedure which differs somewhat depending upon the type of diol-borate complex.

For $\beta$-diol-borate complexes, liberation of the diol is readily achieved because the hydrolysis of the complex into the desired diol and borate is rather extensive. In a preferred procedure, the extracted residue is dissolved in a small quantity of water. Thereupon, the liberated diol is extracted from this aqueous solution by treatment with ether, chloroform or benzene. This operation may be repeated several times whereby the hydrolysis equilibrium is displaced until complete extraction is achieved.

For $\alpha$-diol-borate complexes, the liberation is more difficult because the hydrolysis of the complex is relatively incomplete. In this separation procedure, acidification is required for obtaining the free diol. However, with acidification, a part of the complex is also converted into a cyclic boric ester which must afterwards be eliminated from the solution.

In a preferred proceduce for effecting this separation, the insoluble residue, i.e. containing the (racemic) $\alpha$-diol-borate complex and the excess of complexing agent, is initially dissolved in an acidified aqueous solution, such as an aqueous solution of sulfuric acid. This treatment results in the isolation of a substantial part of the free diol plus a relatively small fraction of boric ester. The two fractions, i.e. diol and ester, are then separated by treatment with an alkali. The alkali does not react with the diol fraction, but does react with the ester fraction forming a borate complex. The net result is thus a reduction of the borate content of the solution, which can then be extracted to yield the pure diol. The remaining alkali-borate complex solution may again be acidified to give on extraction a mixture of diol and boric ester, which can be treated with alkali to give a second amount of pure racemic diol. This procedure may be repeated until the complete extraction of the desired pure diol is achieved.

The following examples will serve to illustrate the practice of this invention:

EXAMPLE I

*Separation of 1,3-Diphenylpropane Diol 1,3-Isomers*

To a methanol solution of the diols, an excess of boric acid and sodium hydroxide was added. Methanol and water were then eliminated from the system by evaporation to dryness. The residue was then extracted with ether. The racemic isomer (M.P. 128°–129° C.) was thereupon obtained from this etheric solution by crystallization.

The insoluble portion was then dissolved in water and the solution so obtained was extracted with ether. This operation was repeated ten times. The hitherto unknown meso isomer (M.P. 108–109° C.) was obtained in pure form by recrystallization from benzene.

The total yield of both diols was nearly quantitative.

EXAMPLE II

*Separation of 1,2-Diphenylethylene Glycol Isomers*

To a methanol solution of the diols, an excess of boric acid and sodium hydroxide was added. Methanol and water was then eliminated from the system by evaporation to dryness. The residue was then extracted with benzene. The meso isomer (M.P. 136–137° C.), referred to as hydrobenzoin, was crystallized out in pure form from this benzenic solution.

The insoluble part was then treated with 2 N $H_2SO_4$ and the solution extracted with chloroform. The chloroform solution was washed with aqueous NaOH and the chloroform evaporated to yield pure diol. The alkaline washing solution was then acidified and the operation was repeated several times to yield further crops of diol. The racemic isomer, isohydrobenzoin, was recrystallized from benzene (M.P. 119–120° C.). Alternatively, water could be employed for the recrystallization step.

The total yield of both isomers was nearly quantitative.

EXAMPLE III

*Separation of 1,2-Ditertiary Butyl Ethylene Glycol Isomers*

To a methanol solution of the diols, an excess of boric acid and sodium hydroxide was added. Methanol and water were then eliminated from the system by evaporation to dryness. Extraction of the residue with ether gave, after recrystallization, the meso isomer in pure form (M.P. 125° C.). The insoluble part was thereupon treated with 2 N $H_2SO_4$ and the solution extracted with ether in order to dissolve the hydrolytically stable boric ester (M.P. 98° C.).

The ester was then boiled in water for about one hour. The mixture was then again extracted with ether and the racemic isomer, in pure form (M.P. 108° C.) was thereupon obtained.

The total yield of both isomers was nearly quantitative.

What is claimed is:

1. A process for the separation of isomers selected from the group consisting of open-chain $\alpha$- and open-chain $\beta$-diols and mixtures thereof, said diols having terminal groups selected from the grouping consisting of aliphatic and aryl groups which are sterically larger than methyl groups and the tertiary carbon atoms of said diols having not more than one substituent sterically larger than a methyl group, which comprises contacting said isomers with an alkali metal borate to selectively form a stable diol-borate complex of one isomer, and thereafter separating said stable complex from the non-complexed isomer.

2. A process as claimed in claim 1, in which the diol-borate complex is separated from the non-complexed isomer by removing water from the reaction mixture, redissolving only the non-complexed isomer, and separating the complex-residue therefrom.

3. A process as claimed in claim 2, in which a concentrated aqueous solution of an alkali metal borate is employed, said solution containing an excess of borate, with respect to the diols to be separated, and an excess of alkali metal, with respect to the borate.

4. A process as claimed in claim 1, in which the alkali metal borate is sodium borate.

5. A process as claimed in claim 1, in which the alkali metal borate is potassium borate.

6. A process as claimed in claim 1, in which, when the isomers are $\alpha$-diols, only the racemic isomer forms the stable diol-borate complex.

7. A process as claimed in claim 1, in which, when the isomers are $\beta$-diols, only the meso isomer forms the stable diol-borate complex.

8. A process as claimed in claim 3, in which the removal of water is effected by evaporating the complex-isomer mixture to dryness, extracting the residue obtained with a solvent which will selectively dissolve only the non-complexed isomer, and removing the complex residue therefrom.

9. A process as claimed in claim 8, in which the solvent is a member selected from the group consisting of ether, chloroform and benzene.

10. A process as claimed in claim 8, in which after removal from the non-complexed isomer, the diol of the diol-borate complex is separated therefrom by effecting the hydrolysis of the complex and removing the free diol fraction obtained.

11. A process as claimed in claim 10, in which, when the complex is an $\alpha$-diol-borate complex, an acidified aqueous solution is employed as the hydrolyzing agent.

No references cited.